United States Patent
Mohamed El Amine et al.

(10) Patent No.: US 11,789,850 B2
(45) Date of Patent: Oct. 17, 2023

(54) SYSTEM AND METHOD FOR TESTING A PHYSICAL SYSTEM INCLUDING SOFTWARE AND HARDWARE

(71) Applicant: Siemens Aktiengesellschaft, Munich (DE)

(72) Inventors: Houyou Mohamed El Amine, Jersey City, NJ (US); Emmanuel Bisse, Washington, NJ (US)

(73) Assignee: Siemens Aktiengesellschaft, Munich (DE)

( * ) Notice: Subject to any disclaimer, the term of this patent is extended or adjusted under 35 U.S.C. 154(b) by 177 days.

(21) Appl. No.: 17/425,986

(22) PCT Filed: Feb. 4, 2019

(86) PCT No.: PCT/US2019/016461
§ 371 (c)(1),
(2) Date: Jul. 27, 2021

(87) PCT Pub. No.: WO2020/162868
PCT Pub. Date: Aug. 13, 2020

(65) Prior Publication Data
US 2022/0197781 A1 Jun. 23, 2022

(51) Int. Cl.
*G06F 11/36* (2006.01)
*G06F 11/26* (2006.01)

(52) U.S. Cl.
CPC ........ *G06F 11/3664* (2013.01); *G06F 11/261* (2013.01); *G06F 11/3688* (2013.01)

(58) Field of Classification Search
CPC ........ G06F 11/36–3696; G06F 11/261; G06F 11/3457–3461; G06F 9/455; G06F 30/18; G06F 30/20–28; G06F 2111/02
See application file for complete search history.

(56) References Cited

U.S. PATENT DOCUMENTS 5,953,516 A 9/1999 Bonola
8,924,190 B2 * 12/2014 Djelassi ........... G01K 7/42
703/2

(Continued)

FOREIGN PATENT DOCUMENTS

EP 2804058 A2 11/2014

OTHER PUBLICATIONS

Sonmez, C., et al., "EdgeCloudSim: An Environment for Performance Evaluation of Edge Computing Systems", Second Int'l Conf. on Fog and Mobile Edge Computing (FEMC) [online], 2017 [retrieved Mar. 21, 2023], Retrieved from Internet: <URL: https://ieeexplore.ieee.org/document/7946405>, pp. 39-44.*

(Continued)

*Primary Examiner* — Todd Aguilera

(57) ABSTRACT

A method of testing a physical system that includes software and hardware includes developing a software application arranged to operate at least a portion of the physical system and constructing a simulation of the physical system within a test ecosystem, the simulation including inputs that simulate control inputs of the physical system and outputs that simulate control and informational outputs. The method also includes connecting the software application to the simulation of the physical system to test the operation of the software application, and simulating operation of the physical system and the software application within test ecosystem operation of the software application as each of a cloud application, a network operation of the software application as each of a cloud application, a network application, and a local application.

6 Claims, 2 Drawing Sheets

(56) References Cited

U.S. PATENT DOCUMENTS

| | | | |
|---|---|---|---|
| 2009/0172621 A1* | 7/2009 | Sathe | G06F 30/30 |
| | | | 716/113 |
| 2011/0238351 A1* | 9/2011 | Djelassi | G01K 13/02 |
| | | | 702/99 |
| 2011/0282642 A1 | 11/2011 | Kruger et al. | |
| 2015/0019191 A1 | 1/2015 | Maturana et al. | |

OTHER PUBLICATIONS

International Search Report dated Nov. 4, 2019; International Application No. PCT/US2019/016461; 13 pages.

* cited by examiner

SYSTEM AND METHOD FOR TESTING A PHYSICAL SYSTEM INCLUDING SOFTWARE AND HARDWARE

TECHNICAL FIELD

The present disclosure is directed, in general, to a system and method for testing software applications, and more specifically to a system and method for testing the operation of a software application with a physical system.

BACKGROUND

Developing software solutions for operating and automating products such as turbines, trains, factories and the like can be challenging as the software must be tested under different operating conditions that are often unpredictable. An application might run satisfactorily in one situation on the cloud, or in a fog-based platform but the same application may not operate in another situation unless it is locally hosted in an embedded controller attached to the process or machine it controls. Due to the significant variation in operation in large industrial systems significant testing under a large variation in conditions must be performed.

SUMMARY

A method of testing a physical system that includes software and hardware includes developing a software application arranged to operate at least a portion of the physical system and constructing a simulation of the physical system within a test ecosystem, the simulation including inputs that simulate control inputs of the physical system and outputs that simulate control and informational outputs. The method also includes connecting the software application to the simulation of the physical system to test the operation of the software application, and simulating operation of the physical system and the software application within the test ecosystem, the test ecosystem operable to simulate operation of the software application as each of a cloud application, a network application, and a local application.

In another construction, a method of testing a physical system that includes software and hardware includes establishing a cloud-based test ecosystem that simulates an operating system and a system arrangement, and constructing within the test ecosystem a simulation of the physical system by selecting elements from a library of simulation elements, each element simulating a physical component and including a latency value that simulates delays inherent in each physical component. The method further includes placing a software application within the test ecosystem, the software application connected to the simulation of the physical system to communicate inputs to the simulation of the physical system and to receive outputs from the simulation of the physical system, operating the simulation of the physical system, and outputting performance data related to the operation of the software application and the simulation of the physical system.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
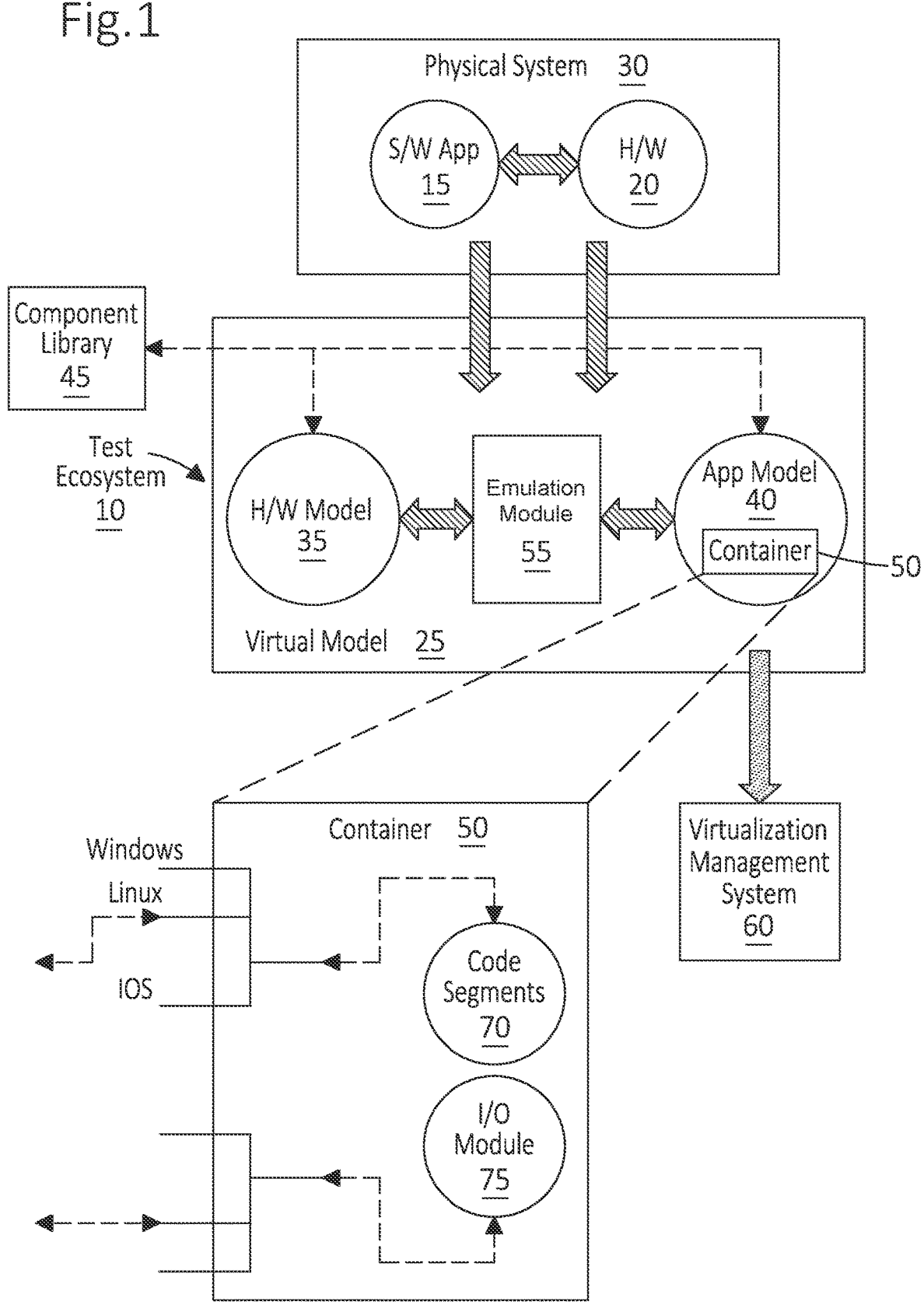
FIG. 1 is a schematic illustration of a test ecosystem of testing new applications.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

FIG. 1 schematically illustrates a system or environment 10 for testing software applications 15, and particularly control applications for use with hardware systems 20. The illustrated system 10 is particularly suited to testing applications for hardware 20 that is not easily tested in actual operation. For example, power generation turbines are high-energy machines that can be severely damaged if operated outside of normal operating parameters. Testing software 15 on an actual machine can result in this undesirable operation and is therefore difficult and potentially costly to perform.

FIG. 1 illustrates the test environment or test ecosystem 10 that is well-suited to testing new software applications 15 with existing hardware 20. The illustrated test ecosystem 10 is preferably cloud-based but could also be network-based or locally maintained on a user's computer. The test ecosystem 10 provides an environment for the user to construct a virtual model 25 of the physical system 30 including both a model of the hardware 35 and a model of the software 40. The physical system may include, for example, one of an engine, a building, and a factory. A database or library of common physical attributes or components 45 (e.g., valves, hydraulics, turbines, motors, etc.) is provided to allow the user to build the virtual model 25. In addition, as the user develops simulations of new components, those simulations can be added to the library 45. Each virtual model 25 or component simulates the actual operation of the physical system 30 or component including an expected latency or delay in operation of that system 30 or component. According to a disclosed embodiment, the library 45 of simulation elements includes a simulated fluid powered actuator, wherein the simulated fluid powered actuator includes an input valve position and an input fluid pressure and wherein the simulated fluid powered actuator outputs a current position and a time to reach a desired position. For example, a simulation of a physical hydraulic valve could receive a signal that indicates the desire to open the valve. The simulation could instantly move the valve to the desired position, however this is not realistic. The latency value which is part of each simulation accounts for the real-world physical delay by delaying the movement of the valve in the simulation. The library 45 of simulation elements may additionally include a simulated sensor that includes an output for outputting a measured value. For example, the simulated sensor may simulate a thermocouple, wherein the latency value is related to the thermal inertia of the thermocouple. The simulations could include machine learning as well as artificial techniques that provide similar or the same outputs based on historical data of operation of such systems in the real world.

The test environment 10 also provides access to a library of containers 50 for use with the software application 15 to be tested. Containers 50 are software packages that receive the software application 15 to allow the software application 15 to operate on any operating system including Linux, Windows, iOS, QHX, BSD, and the like. In simple terms, the container 50 includes internal connections that connect segments of code 70 or input/output modules 75 as desired. The container 50 also includes external connections for any operating system. When outputting from the segments of code 70 or input/output modules 75, the container 50 thus takes one internal signal from the segments of code 70 or input/output modules 75 and conditions that signal as required for any of the available operating systems. A proper output signal is then available for any of the operating systems with the signal for the operating system being used, being the only external connection. When inputting a signal, the process is reversed. The signal comes from the operating system being used and enters the container 50 via the proper external connection. The signal is then conditioned and delivered to the segment of code 70 or input/output module 75.

An emulation module 55 provides the connections between the application model 40 and more specifically, the container 50 or containers and the model of the hardware 35. The emulation module 55 can be configured to simulate multiple different arrangements of the application model 40 and the model of the hardware 35. For example, the emulation module 55 could be arranged to simulate the application 15 being a cloud-based application that interacts with the hardware system 20 or could simulate the application 15 running on a server that is remote to the hardware 20 or on the same physical site. The emulation module 55 simulates the expected latency delays between the hardware system 20 and the application 15 depending on the selected architecture between the two. The virtual model 25 can then be run simulating the application 15 in a cloud-based configuration, a network-based configuration, as a locally-stored application, or any other arrangement that might be advantageous. Data that is generated can be sent to a virtualization management system 60 and collected for further analysis.

As illustrated in FIG. 1, the virtual model 25 or digital twin of the physical system 30 is constructed in a cloud-based or offline eco-system 10 that offers an extendable development and purely digital deployment environment. The libraries 45 can be provided based on the system needed to allow for the creation of the digital twin 25 of the target physical system 30 before the physical system 30 and control application 15 are implemented. The digital twin 25 can be composed of small and larger simulations of, and digital mock-ups of the real physical system 30. The digital twin 25 runs in a virtualized infrastructure in the cloud or in other environments as required. The digital twin 25 includes exposed interfaces that allow for programming and testing from simple to complex control systems (e.g., SCADA, IVIES, etc.). The application 15 is then deployed in the test eco-system 10 to test the application 15 and the physical system 20 together in containers 50 and virtual machines that re-create the physical system 30. The application resources and load can be measured and quantified while running in close collaboration with the emulated digital twin 25 of the physical system 30.

After test operation, the application's requirements in terms of computing power and other resources are known. The system 10 also tests and measures the latency bounds under which the application 15 interacts with the emulated physical system 35. These delay and performance bounds can be provided to a virtualization management system 60 (e.g. DMTF Redfish) that can redeploy the same containers 55 and virtual models 25 to the right type of computing elements (e.g. edge cloud, server rack, or number of PLCs), while fulfilling the described requirements. The same applies to communication requirements which most affect latency that can be derived from the system 10 before describing configuration needs for the physical system 30. Such technologies as software-defined networks can be fed with such information. TOSCA provided by Tricentis, is an example declarative language to describe requirements of applications 15 when it comes to deployment in any computational and networked environment.

The virtual models 25 and containers 50 should be copied as is and placed in the computing elements that fulfill the latency and resource requirements determined using the test eco-system 10.

The test eco-system 10 described herein greatly improves the reliability of software 15 that is implemented with industrial devices such as turbines, trains, and the like. In addition, the system 10 reduces the likelihood of damage or improper operation of devices 20 that often occurs during testing or initial operation of a new software component 15.

Figure 2:
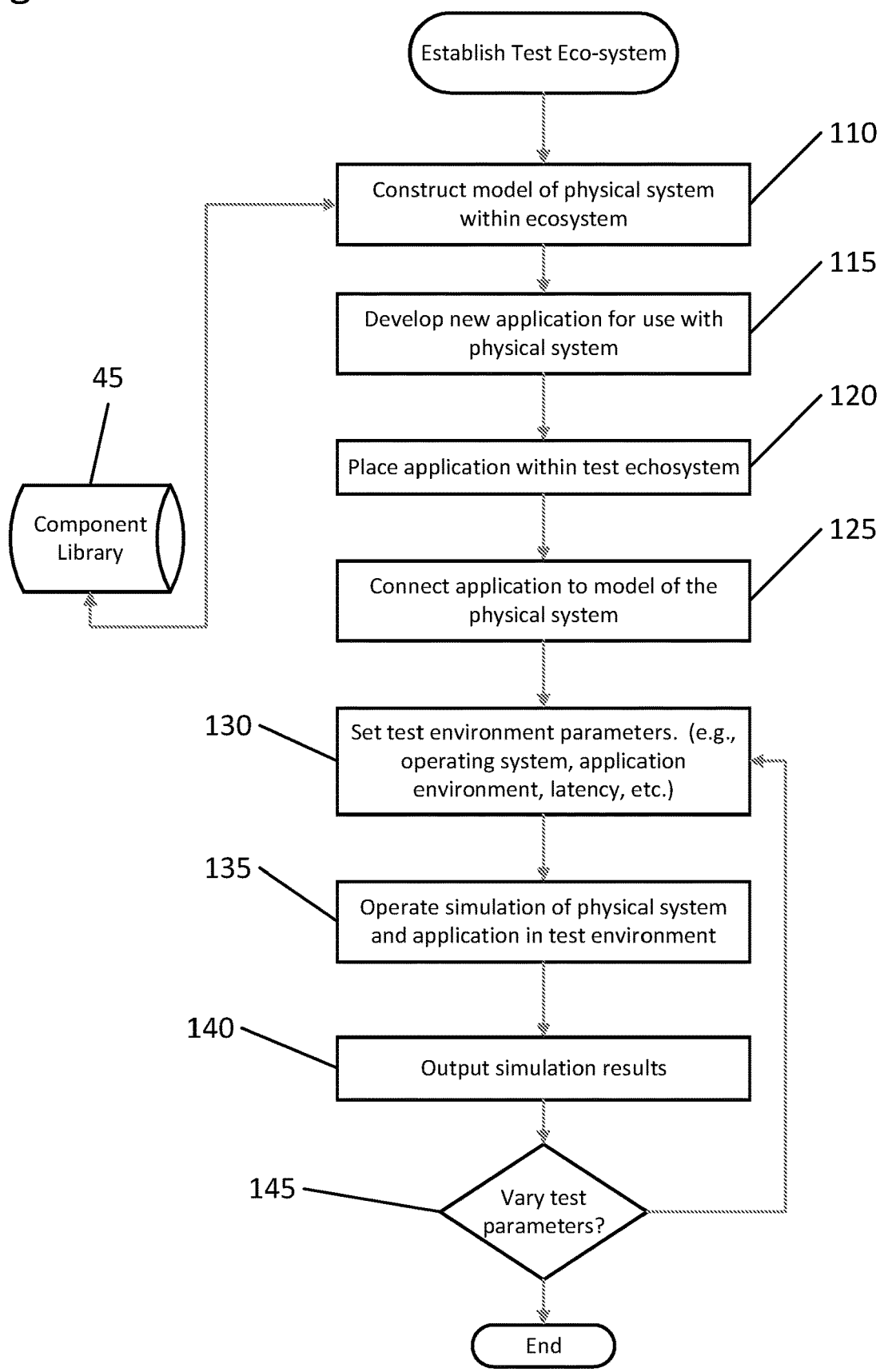
FIG. 2 is a flowchart illustrating an application testing process.

FIG. 2 illustrates a process of using the test eco-system 10 of FIG. 1. The initial step in the process is to construct a model of the physical system within the test environment (step 110). The construction can utilize prior components that were constructed and stored in the component library 45. The new application can be developed simultaneously, before, or after the construction of the digital twin or virtual model of the physical system step 115). The application is then placed within the test eco-system (step 120) with the digital twin 35 of the hardware portion of the physical system 30. The application 40 is then connected to the model of the system 35, typically through an emulation module 55 at step 125. Prior to testing, any test parameters such as the operating system, the application environment (e.g., cloud-based, local, etc.) and any other latency parameters are applied to the system, typically via the emulation module 55 (step 130). The simulation is then run at step 135 and the results are output at step 140. If it is desirable to vary the test parameters and rerun the test, those parameters are changed and the process repeats starting at step 125 (step 145). Once the desired data is collected, the simulation ends.

The control system can be broken down (independent of what we want to control) into sensors, actuators, and controller logic. The software representing the controller logic usually reads both the states of the actuators and the sensors and deduces the next change of process state which is converted to and sent to the various actuators as inputs.

The simulation allows the software developer to write the correct control logic, but can test the behavior of operating the control software under different conditions, such as adding delay between the control application and its process (actors/sensors) to find out optimal execution and communication conditions. A given latency threshold might lead to the process being in the wrong state or failing if the sensor values are not transmitted on time, or the command sent to an actuator ("open valve") are received too late. The simulation can capture such operating ranges during development of the operation.

It is then also used to describe requirements on how to deploy the application. In terms of latency, both the execution environment and network end-to-end QoS play a role in achieving a minimum level of latency described from the simulation step above.

The deployment management of a containerized application or an application running in a virtual machine includes the allocation and guaranteeing of computing and memory to a given container or virtual machine, and also being able to predict network delay through a software defined network controller for instance or some network management system that takes requests for certain requirements on delay and bandwidth as input and responds by whether the network path to the cloud or to an edge server or to localized embedded controller are best.

The Container and virtual machine can be deployed anywhere as long as the requirements are met.

There could be a cost function to decide that delay tolerant applications should not utilize the valuable and limited resources on edge and localized controller devices. Therefore, favoring shifting load to the cloud.

It is also possible to test deployments after it has happened against the simulation of the process again before the control logic is allowed to run the real system.

This becomes more essential since controller software is moving towards more modern programming and execution basis such as event-driven and publish/subscribe type of communication between process and application and also for AI based control logic which will require more computing and memory resources that only edge servers or cloud environments can provide.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of testing a physical system that includes software and hardware, the method comprising:
    developing a software application arranged to operate at least a portion of the physical system;
    constructing a simulation of the physical system within a test ecosystem, the simulation including inputs that simulate control inputs of the physical system and outputs that simulate control and informational outputs;
    connecting the software application to the simulation of the physical system to test the operation of the software application; and
    simulating operation of the physical system and the software application within the test ecosystem, the test ecosystem operable to simulate operation of the software application as each of a cloud application, a network application, and a local application,
    wherein the method comprises providing a library of simulation elements each selectable to simulate a component of the physical system to construct the simulation of the physical system, and wherein the library of simulation elements includes a simulated fluid powered actuator and wherein the simulated fluid powered actuator includes an input valve position and an input fluid pressure and wherein the simulated fluid powered actuator outputs a current position and a time to reach a desired position.

2. The method of claim 1, further comprising providing one of a container and a virtual machine and placing the software application within the one of the container and the virtual machine (VM), the one of the container providing input and output connections that are independent of the operating system on which the container and the software application operate.

3. The method of claim 1, wherein each of the simulation elements includes a latency value that simulates delays that are inherent in each of the components of the physical system.

4. The method of claim 3, wherein the library of simulation elements includes a simulated sensor that includes an output for outputting a measured value.

5. The method of claim 4, wherein the simulated sensor simulates a thermocouple and wherein the latency value is related to the thermal inertia of the thermocouple.

6. The method of claim 1, wherein the physical system includes one of an engine, a building, and a factory.

* * * * *